(12) United States Patent
Seipler (10) Patent No.: US 7,250,066 B2
(45) Date of Patent: Jul. 31, 2007

(54) CENTRIFUGE FOR SEPARATING SOOT FROM THE EXHAUST OF AN INTERNAL COMBUSTION ENGINE

(75) Inventor: Dieter Seipler, Leonberg (DE)

(73) Assignee: Mann & Hummel GmbH, Ludwigsburg (DE)

( * ) Notice: Subject to any disclaimer, the term of this patent is extended or adjusted under 35 U.S.C. 154(b) by 452 days.

(21) Appl. No.: 11/020,115

(22) Filed: Dec. 27, 2004

(65) Prior Publication Data

US 2005/0160723 A1    Jul. 28, 2005

Related U.S. Application Data

(63) Continuation of application No. PCT/EP03/006781, filed on Jun. 26, 2003.

(30) Foreign Application Priority Data

Jun. 27, 2002    (DE) ............................ 102 28 682

(51) Int. Cl.
*B01D 45/14*    (2006.01)
(52) U.S. Cl. ................ 55/337; 55/406; 55/409; 55/435; 55/438; 55/DIG. 30
(58) Field of Classification Search .............. 55/337, 55/404, 406, 408, 409, 435, 437, 438, DIG. 30; 123/198 E
See application file for complete search history.

(56) References Cited

U.S. PATENT DOCUMENTS

| 1,434,562 | A |   | 11/1922 | Quam |
|---|---|---|---|---|
| 4,198,218 | A | * | 4/1980 | Erickson ...................... 55/408 |
| 4,840,645 | A | * | 6/1989 | Woodworth et al. .......... 95/270 |
| 5,016,437 | A |   | 5/1991 | Huether et al. |

FOREIGN PATENT DOCUMENTS

| DE | 1 039 997 | 10/1958 |
|---|---|---|
| DE | 3830761 A1 | 3/1990 |
| EP | 0 220 505 A | 5/1987 |
| EP | 0 515 776 A | 12/1992 |
| FR | 2 701 513 A | 8/1994 |
| WO | WO 02 34407 A | 5/2002 |
| WO | WO 2004/003354 A1 | 1/2004 |

* cited by examiner

*Primary Examiner*—Robert Hopkins
(74) *Attorney, Agent, or Firm*—Crowell & Moring LLP (57) ABSTRACT

A centrifuge (10) suitable for separating soot from an exhaust gas stream of an internal combustion engine; the centrifuge being disposed between, and arranged coaxially in relation to, a raw gas inlet pipe (11) and a clean gas outlet pipe (12); the centrifuge including a rotating body (20) which is open on both axial end faces, drive vanes (26) arranged adjacent the inlet for driving the centrifuge, and at least one device (29) provided inside said rotating body for reversing or deflecting the exhaust gas flow direction.

11 Claims, 7 Drawing Sheets

CENTRIFUGE FOR SEPARATING SOOT FROM THE EXHAUST OF AN INTERNAL COMBUSTION ENGINE

CROSS REFERENCE TO RELATED APPLICATIONS

This application is a continuation of international patent application no. PCT/EP03/006781, filed Jun. 26, 2003, designating the United States of America, and published in German as WO 2004/003354 A1 on Jan. 8, 2004, the entire disclosure of which is incorporated herein by reference. Priority is claimed based on Federal Republic of Germany patent application no. DE 102 28 682.5, filed Jun. 27, 2002.

BACKGROUND OF THE INVENTION

The invention relates to a centrifuge, especially for the separation of soot from an exhaust gas stream of an internal combustion engine.

U.S. Pat. No. 5,016,437 (=DE 38 30 761) discloses a centrifugal separator for soot particles in which the soot particles are deposited against an outer circumferential surface of a housing. Heating elements are arranged adjacent the wall for combusting the soot particles. The turbine rotor of an exhaust gas turbine is utilized as a drive, i.e., as a centrifugal force drive.

Furthermore, German patent application no. DE 10 39 997 discloses a centrifuge with propellers in which carrier guide ribs are arranged in the interior of the centrifuge and slots are provided through which contaminants, i.e., the separated particles, can be forceably discharged.

U.S. Pat. No. 1,434,562 describes a centrifugal separator for the intake air of an internal combustion engine having a plate separator which diverts the gas flow and thereby separates particles from the gas stream. The plate separator is driven by an air rotor constructed as an individual drive, which is arranged at the separator outlet.

A soot filter is likewise known having a ceramic body which takes up the soot particles. For regeneration an additive is utilized which decreases the soot ignition temperature and facilitates burning off the soot from the ceramic body.

Another system is known in which the exhaust gas is diverted and the particles are retained in a metal mat. This filter system cannot plug up, and the system can be regenerated at high temperatures because of the resistance or durability of the medium. However, there is a danger that a portion of the particles can pass unhindered through this system and flow out into the environment.

The known and described devices for separation of particles are expensive to construct and in part require additional devices, such as, for example, heating devices, for burning off the separated particles.

SUMMARY OF THE INVENTION

It is an object of the invention to provide an improved centrifuge for separating soot from exhaust of an internal combustion engine.

Another object of the invention is to provide a centrifuge for separating particles from a gas stream which has a simple construction.

A further object of the invention is to provide a centrifuge which does not require supplementary devices for burning off separated soot.

It is also an object of the invention to provide a centrifuge for separating particulate material from a gas stream which exhibits a high separation efficiency.

These and other objects are achieved in accordance with the present invention by providing a centrifuge for separating soot from an exhaust gas stream of an internal combustion engine, the centrifuge being disposed between a raw gas inlet pipe and a clean gas outlet pipe and arranged substantially coaxially to the inlet and outlet pipes; the centrifuge comprising a rotatable body open at both axial ends, which has drive vanes arranged on the inlet side for driving the centrifuge and has at least one device for reversing or diverting the flow direction of the exhaust gas stream inside the rotating body.

The substantial advantage of the centrifuge of the present invention lies in the fact that it is directly installed in the exhaust pipe of an exhaust gas stream, has its own drive, e.g., in the form of drive vanes which are arranged on the inlet side, by which the separation is achieved due to the effects of centrifugal force and the flow is directed to the outlet side.

One embodiment of the invention envisions that a plurality of flow reversing devices in the form of conical rings is provided. In this way the centrifuge can be constructed in the manner of a plate separator, which achieves a high separation efficiency at a high air throughput.

A further embodiment envisions providing the cylindrical inner wall of the housing of the rotating body with a coating or with a roughened surface, which favors adhesion of soot particles and improves the collection of the soot.

In accordance with a further embodiment, it is proposed to provide the inner wall of the housing with a catalytic coating, which decreases the ignition temperature of the soot. This catalytic coating can be composed either of a silver vanadate or of a copper vanadate, which contains alkali metal. In this way the ignition temperature of the soot or the soot particles can be significantly reduced, e.g. down to about 365° C.

In accordance with a further embodiment it is proposed in order to achieve a simple mounting of the centrifuge to arrange a first bearing in the raw gas inlet pipe and a second bearing in the clean gas outlet pipe and to attach the centrifuge via these two bearings in the exhaust channel. As a result of this construction, an in-line centrifuge is formed, which is provided in the area of a junction in the exhaust gas channel or which has an openable housing which is integrated in the exhaust gas channel.

In order to burn off the soot, i.e. for the purpose of regeneration, it is also possible to enrich the exhaust gas with $NO_x$, in order to thereby achieve a rapid and reliable cleaning of the exhaust gas in conjunction with the further measures.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which:

FIG. 1b shows a three-dimensional view of the centrifuge shown in FIG. 1a;

FIG. 2b shows a three-dimensional view of the centrifuge shown in FIG. 2a.

FIG. 3 shows a further sectional view of the centrifuge shown in FIG. 2a.

FIG. 4b shows a three dimensional view of the centrifuge shown in FIG. 4a.

In the drawings, like parts are identified by like reference numerals.

DETAILED DESCRIPTION OF PREFERRED EMBODIMENTS

Figure 1A:
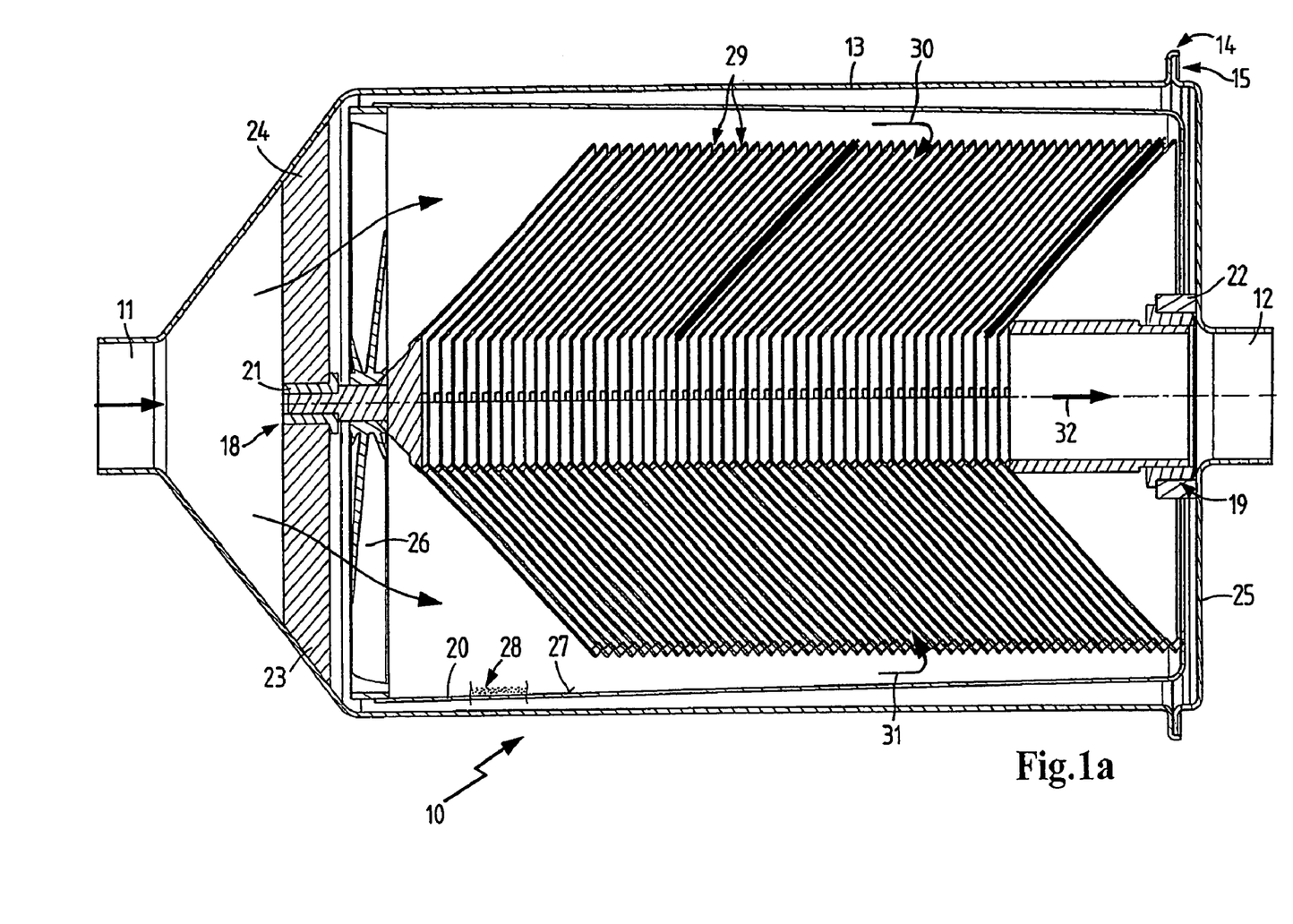
FIG. 1a shows a sectional view through a first centrifuge embodiment according to the invention.

FIG. 1a shows a soot centrifuge 10 which is constructed as an in-line centrifuge and is arranged between a raw gas inlet pipe 11 and a clean gas outlet pipe 12. The centrifuge is located in a housing 13, which is directly connected to the raw gas inlet pipe and the clean gas outlet pipe and has a flange joint or connection 14, which is provided with a suitable closure system 15. Coaxial bearings 18 and 19 are provided adjacent both the raw gas inlet and also the clean gas outlet, which support the centrifuge rotor 20. The bearings 18 and 19 are advantageously a slide bearing with ceramic bushings 21, 22, which are resistant to high temperatures. The bearing 18 is attached to struts 23, 24. The bearing 19 is arranged on a housing cover 25, which joins outlet pipe 12.

The centrifuge has drive vanes 26 on the gas inlet side which cause the centrifuge rotor to rotate when exhaust gases flow in. The centrifuge itself is substantially a rotatable body having an inner housing wall 27 on which the separated soot 28 can be deposited. The centrifuge further comprises a plurality of flow reversing devices in the form of plate disks 29, which achieve a diversion or flow reversal of the exhaust gas stream. On the outlet side, the centrifuge is open to the clean gas outlet pipe 12 and optionally can be provided there with drive vanes under appropriate circumstances. The number of the plate disks 29 depends upon the desired degree of separation or the separation efficiency, and can be varied. In some circumstances a small number of plate disks is sufficient to achieve the desired effect.

The contaminated exhaust gas flows through the raw gas inlet pipe 11 into the radially outer region of the centrifuge rotor. There it is caused to rotate so that due to the centrifugal force the soot particles 28 are deposited against the housing inner wall 27. The exhaust gas thereafter flows in accordance with the arrows 30, 31 into the radially inner region of the centrifuge rotor and is subjected to a flow diversion or reversal and conducted to the clean gas outlet pipe 12 in accordance with arrow 32.

To support the adhesion of soot particles to the housing inner wall 27, the wall can be roughened. To improve the burn-off characteristics, the inner wall 27 can be coated with a catalyst. By opening the flange connection 14, it is possible to exchange the entire centrifuge rotor without particular difficulty.

The three-dimensional depiction in FIG. 1b clearly shows once again the drive vanes 26, which drive the rotor, as well as the mounting of the bearing or the ceramic bushing 21 via the four struts 23, 24, 33, 34.

Figure 1B:
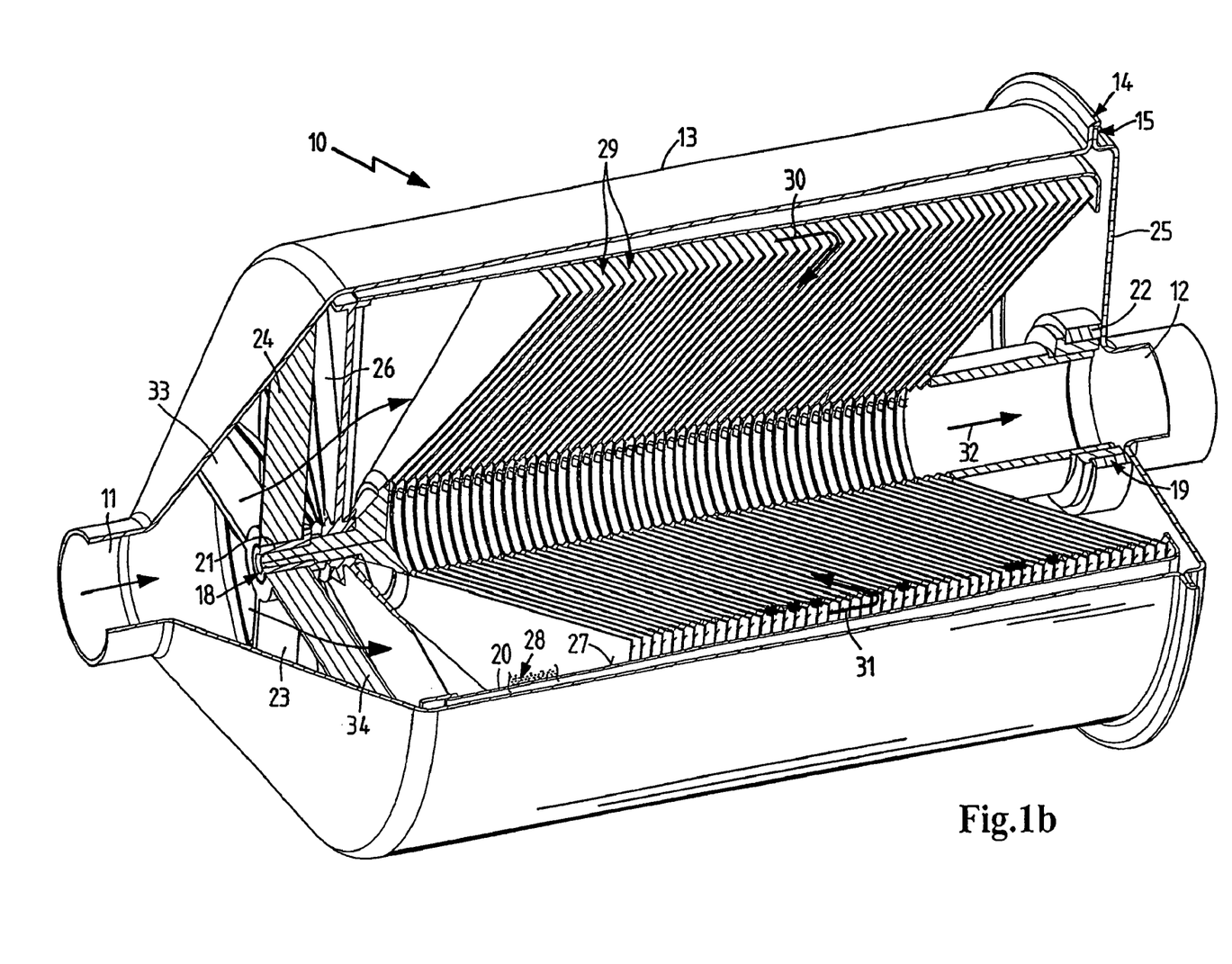
Figure 2A:
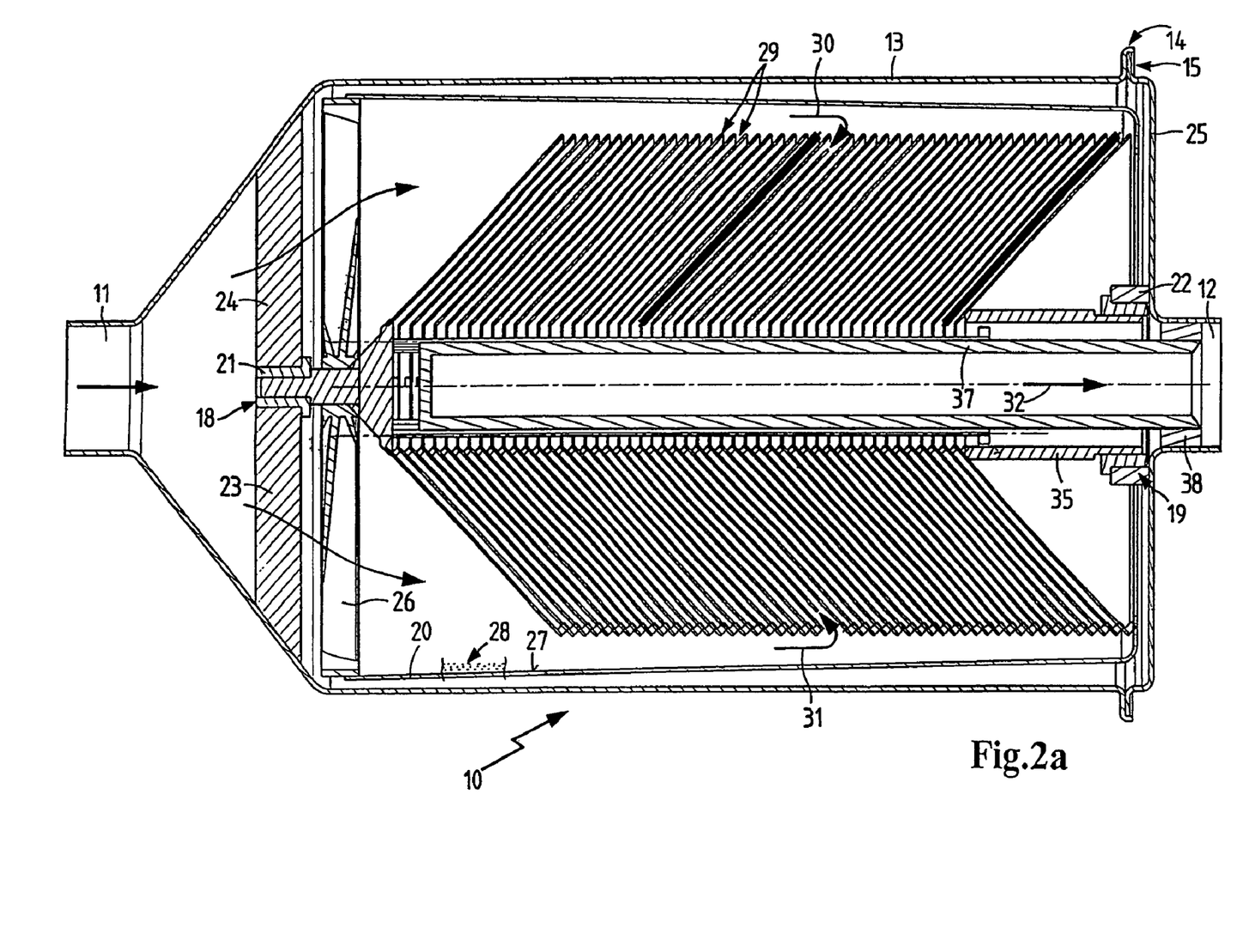
FIG. 2a shows a sectional view through an alternatively constructed centrifuge according to the invention.

FIG. 2a shows a supplemented variant of a soot centrifuge 10 according to the invention. In order to avoid unnecessary repetition, reference is made to the description of FIG. 1b. The difference with respect to the centrifuge shown in FIG. 1b is in the clean gas line or passage, which is formed by the openings of the individual plate disks 29 together with a pipe nipple 35 which leads to the clean gas outlet pipe 12. In this clean gas passage 35 there is a stationarily arranged fixed filter cartridge 37. This filter cartridge 37 may be comprised, for example, of a non-woven metal mesh which is arranged around a supporting body. The fixed filter cartridge 37 is attached to the clean gas outlet pipe 12 via a flange connection 38. The filter cartridge 37 serves to filter out the soot in the exhaust gas under certain operating conditions, e.g. before start-up of the centrifuge. This soot is deposited on the surface of the filter cartridge.

In order to avoid accumulation of soot on the filter cartridge 37, a cleaning device also is provided. The cleaning is effected by a swirl of air which lifts the soot from the surface of the filter 37 and deposits the soot particles on the rotating plate disks 29 during the operation of the centrifuge, which, in turn, convey the soot radially outwardly against the housing inner wall 27.

Figure 3:
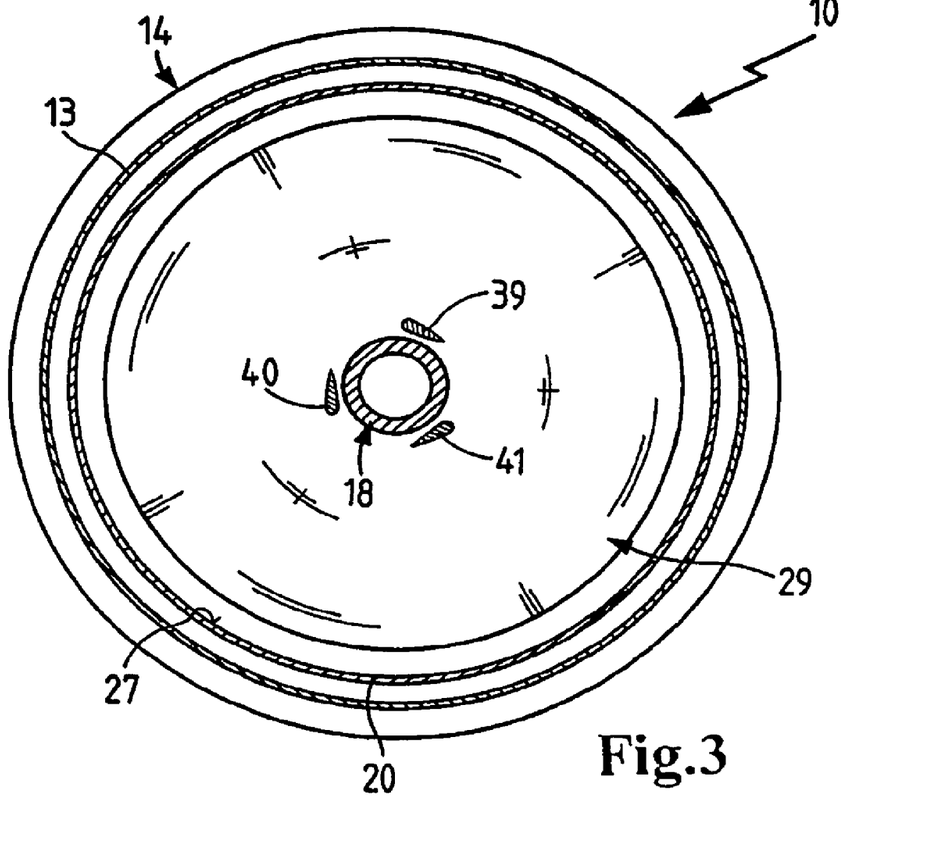

To achieve this cleaning, three vanes 39, 40 and 41 are provided distributed around the circumference of the filter cartridge, as shown in FIG. 3. These vanes 39, 40 and 41 turn with the centrifuge, i.e. they are arranged on the inner openings of the plate disks 29, and have only a slight spacing from the filter cartridge 37. The vanes 39, 40 and 41 generate a swirling gas flow which lifts the soot particles from the filter cartridge 37 and carries them outwardly onto the spinning plate disks 29.

As shown in FIG. 3, the spacing of the plate disks 29 relative to the housing inner wall 27 is rather small. The relatively large diameter of the plate disks 29 improves the degree of separation achieved by the soot centrifuge.

Figure 2B:
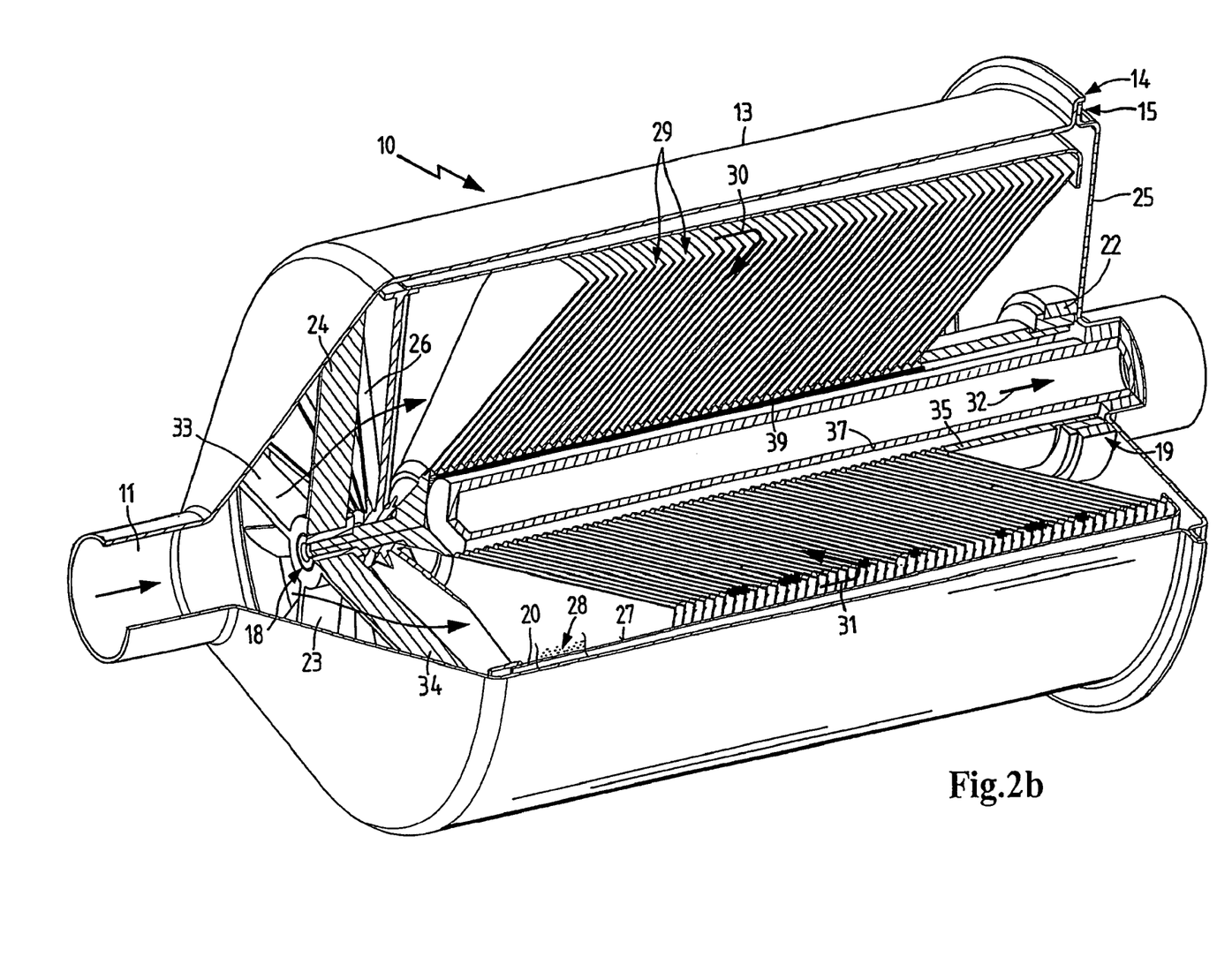

FIG. 2b shows once again a three-dimensional representation of the soot centrifuge shown in a sectional view in FIG. 2a. The filter cartridge 37 and its position in the clean gas line 35 can be clearly seen. Likewise the turbulence generating vane 39 can be seen, which is affixed to the plate disks and is spaced only a small distance from the fixed filter cartridge 37.

Figure 4A:
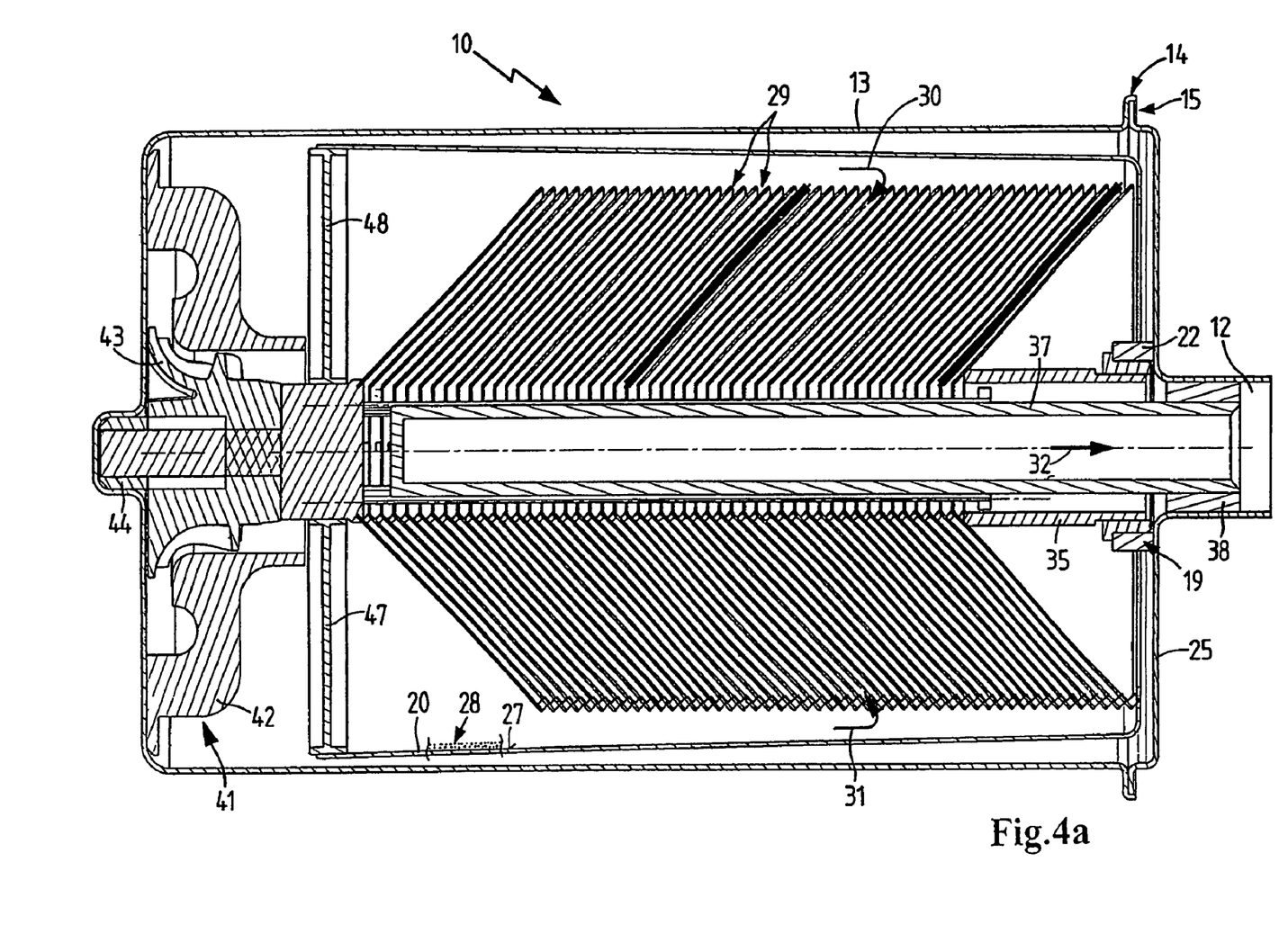
FIG. 4a shows a sectional view of a centrifuge embodiment with a drive turbine.

FIG. 4a shows a soot centrifuge in which the drive is effected via a turbine 41. The turbine 41 is comprised of a turbine housing 42 and a turbine rotor 43. The turbine rotor 43 is mounted in a slide bearing bushing 44 and connected to the centrifuge rotor.

Figure 4B:
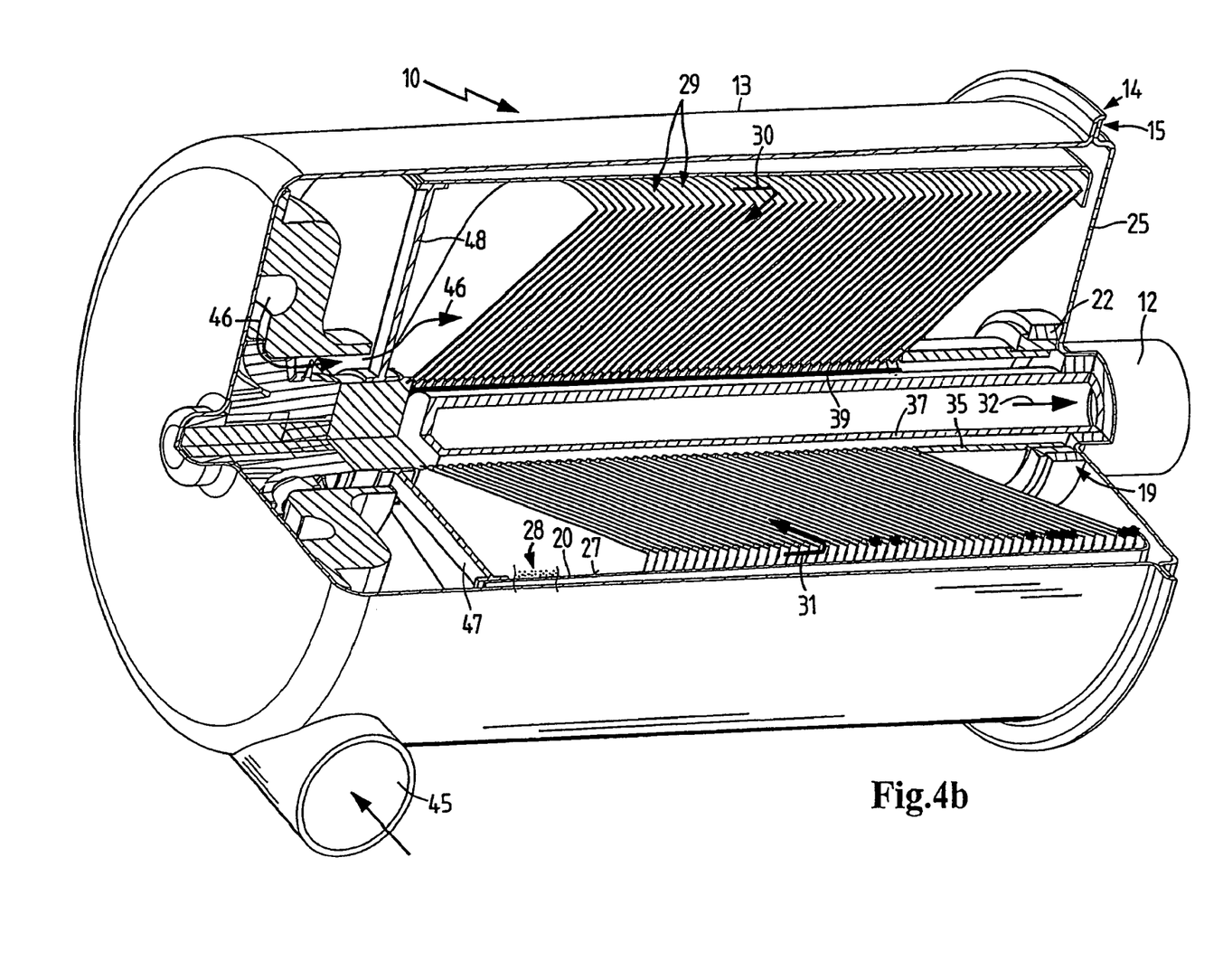

When the soot-laden exhaust gases flow through the tangentially arranged raw gas inlet 45 shown in FIG. 4b, the turbine 41 causes the soot separator to rotate, the raw gas flows through the turbine in accordance with arrow 46 past the struts 47, 48 into the interior space of the centrifuge rotor. This centrifuge is also equipped with a supplemental filter cartridge 37 for cleaning the gas under certain operating conditions of the centrifuge.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A centrifuge for separating soot from an exhaust gas stream of an internal combustion engine, said centrifuge being disposed between a raw gas inlet pipe and a clean gas outlet pipe and arranged substantially coaxially to the inlet and outlet pipes; said centrifuge comprising a rotatable body open at both axial ends, which has drive vanes arranged on the inlet side for driving the centrifuge and has at least one device for reversing or diverting the flow direction of the exhaust gas stream inside the rotating body.

2. A centrifuge according to claim 1, wherein a plurality of flow reversal devices in the form of conical rings is provided.

3. The centrifuge according to claim 1, wherein the rotating body has a cylindrical housing inner wall provided with a coating for promoting adhesion of soot.

4. A centrifuge according to claim 3, wherein the housing inner wall has a catalytic coating, which decreases the ignition temperature of the soot.

5. A centrifuge according to claim 4, wherein the catalytic coating comprises silver vanadate or copper vanadate, which contains alkali metal.

6. A centrifuge according to claim 1, wherein a first bearing is provided in the raw gas inlet pipe and a second bearing is provided in the clean gas outlet pipe, and the centrifuge is mounted by both bearings via a bearing shaft.

7. A centrifuge according to claim 1, wherein the centrifuge is constructed as an in-line centrifuge arranged in an openable housing.

8. A centrifuge according to claim 1, wherein the exhaust gas is enriched with $NO_x$ to facilitate regeneration.

9. A centrifuge according to claim 1, wherein a fixed filter cartridge is arranged inside the rotating body.

10. A centrifuge according to claim 9, wherein the filter cartridge is comprised of a non-woven metal mesh disposed on a support body.

11. A centrifuge according to claim 9, wherein at least one vane is provided attached to the conical rings so as to rotate therewith for cleaning the filter cartridge; the rotating vane causing turbulent gas flow which lifts soot from the filter cartridge and deposits the soot on spinning centrifuge rotor which throws the soot against the rotor housing inner wall.

* * * * *